(12) United States Patent
Miyazaki

(10) Patent No.: US 11,443,899 B2
(45) Date of Patent: Sep. 13, 2022

(54) MULTILAYER CERAMIC ELECTRONIC COMPONENT AND METHOD OF MANUFACTURING THE SAME

(71) Applicant: Murata Manufacturing Co., Ltd., Nagaokakyo (JP)

(72) Inventor: Tomochika Miyazaki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/243,712

(22) Filed: Apr. 29, 2021

(65) Prior Publication Data

US 2021/0375548 A1 Dec. 2, 2021

(30) Foreign Application Priority Data

May 26, 2020 (JP) .............................. JP2020-091794

(51) Int. Cl.
| | | |
|---|---|---|
| *H01G 4/248* | (2006.01) | |
| *H01G 4/30* | (2006.01) | |
| *H01G 4/12* | (2006.01) | |
| *H01G 4/012* | (2006.01) | |

(52) U.S. Cl.
CPC ............... *H01G 4/30* (2013.01); *H01G 4/012* (2013.01); *H01G 4/12* (2013.01); *H01G 4/248* (2013.01)

(58) Field of Classification Search
None
See application file for complete search history.

(56) References Cited

U.S. PATENT DOCUMENTS

| | | | | |
|---|---|---|---|---|
| 5,536,293 A | * | 7/1996 | Yamamoto | ................ C03C 8/18 252/519.54 |
| 2014/0002949 A1 | * | 1/2014 | Gu | ........................... H01G 4/12 361/301.4 |
| 2014/0002950 A1 | * | 1/2014 | Gu | ........................ H01G 4/005 29/25.42 |
| 2014/0292142 A1 | * | 10/2014 | Nishisaka | ................. C03C 8/18 336/200 |
| 2014/0347783 A1 | | 11/2014 | Kisumi et al. | |
| 2016/0039711 A1 | * | 2/2016 | Miyazaki | .................. C03C 8/16 252/519.51 |

(Continued)

FOREIGN PATENT DOCUMENTS

| | | |
|---|---|---|
| EP | 3 496 112 A1 | 6/2019 |
| JP | 2011-129884 A | 6/2011 |

(Continued)

*Primary Examiner* — Dion R. Ferguson
(74) *Attorney, Agent, or Firm* — Keating & Bennett, LLP

(57) ABSTRACT

A multilayer ceramic capacitor includes a glass component of an underlying electrode layer including Zr and Ba, and in a cross-section of the multilayer ceramic capacitor, a Zr/Ba atomic number ratio is not less than about 0.03 and not greater than about 0.15. The underlying electrode layer has a glass-occupied area ratio of not less than about 18% in the cross-section of the multilayer ceramic capacitor. In a SEM image in the cross-section of the multilayer ceramic capacitor, the glass component on an imaginary line α, which is parallel or substantially parallel to the surface of the surface layer of the underlying electrode layer about 3 μm inside of the surface layer of the underlying electrode layer, is not greater than about 0.92 μm.

18 Claims, 5 Drawing Sheets

ENLARGED VIEW OF PORTION a

(56) References Cited

U.S. PATENT DOCUMENTS

2017/0345570 A1* 11/2017 Sakatsume ............. H01G 4/232
2021/0375548 A1* 12/2021 Miyazaki ................. H01G 4/30

FOREIGN PATENT DOCUMENTS

| JP | 2014-170874 | A | | 9/2014 | | |
|----|-------------|---|---|--------|---|---|
| JP | 2021082686 | A | * | 5/2021 | ............ | H01G 4/008 |
| KR | 20140117295 | A | * | 10/2014 | | |
| KR | 101579704 | B1 | * | 12/2015 | | |
| KR | 20170121105 | A | * | 11/2017 | | |
| WO | 2006/090551 | A1 | | 8/2006 | | |
| WO | 2013/128957 | A1 | | 9/2013 | | |
| WO | 2014/175013 | A1 | | 10/2014 | | |
| WO | 2018/025627 | A1 | | 2/2018 | | |

\* cited by examiner

II-II SECTIONAL VIEW

MULTILAYER CERAMIC ELECTRONIC COMPONENT AND METHOD OF MANUFACTURING THE SAME

CROSS REFERENCE TO RELATED APPLICATIONS

This application claims the benefit of priority to Japanese Patent Application No. 2020-091794 filed on May 26, 2020. The entire contents of this application are hereby incorporated herein by reference.

BACKGROUND OF THE INVENTION

1. Field of the Invention

The present invention relates to a multilayer ceramic electronic component and a method of manufacturing the same.

2. Description of the Related Art

A ceramic electronic component, such as a multilayer ceramic capacitor, is commonly formed of a ceramic sintered body made of a dielectric ceramic material, such as barium titanate, and internal electrodes are formed while lying on top of each other with a ceramic layer between the internal electrodes inside the ceramic sintered body. On one end surface of the ceramic sintered body, an external electrode is formed so as to be electrically connected to the internal electrodes, and on the other end surface, an external electrode is formed so as to be electrically connected to the internal electrodes. Such a ceramic electronic component is increasingly used in harsh environments compared with a conventionally used ceramic electronic component, and accordingly, is required to have an improved mechanical strength and improved reliability.

For example, WO 2014/175013 discloses the following. In order to improve mechanical strength and reliability, in a glass composition, which is used to form an external electrode of a multilayer ceramic capacitor, of a conductive paste, BaO, SrO, CaO, $B_2O_3$, $SiO_2$, $Al_2O_3$, and $TiO_2$ can be controlled within a certain range, thereby reducing or preventing elution of the glass composition into a plating solution in a melting step of plating the external electrode while restraining a reaction between ceramic of a ceramic body and the glass composition of the conductive paste. This can improve a plating resistance more reliably. WO 2014/175013 also discloses that floating of glass at the external electrode can be reduced or prevented, and the densification of the external electrode can be improved, thus leading to an improved mechanical strength and improved reliability.

A small-size, large-capacitance electronic component needs to include a thinner external electrode, and accordingly, the development of a technique for higher reliability is desired. When the technique of WO 2014/175013 is used to reduce the thickness of the external electrode, however, the following situation may occur. The thinner external electrode may cause the erosion of the glass composition by a plating solution in plating of the external electrode, thus decreasing a mechanical strength. As a result, a crack may form a short path leading to the ceramic body, thus reducing the moisture resistance reliability of the multilayer ceramic electronic component.

When a component that increases an erosion resistance of the glass composition of the conductive paste, such as $SiO_2$, $Al_2O_3$, or $TiO_2$, is merely increased, a softening point of glass may increase or wettability may decrease, thus hindering densification of the external electrode after sintering of the external electrode.

SUMMARY OF THE INVENTION

Preferred embodiments of the present invention provide multilayer ceramic electronic components that are each able to have higher moisture resistance reliability due to a decreased mechanical strength, and also provide methods of manufacturing the multilayer ceramic electronic components.

A multilayer ceramic electronic component according to a preferred embodiment of the present invention includes a multilayer body including a stack of a plurality of ceramic layers and including a first main surface and a second main surface facing each other in a stacking direction, a first lateral surface and a second lateral surface facing each other in a width direction orthogonal or substantially orthogonal to the stacking direction, and a first end surface and a second end surface facing each other in a length direction orthogonal or substantially orthogonal to the stacking direction and the width direction; a first internal electrode layer on a corresponding one of the plurality of ceramic layers and located inside the multilayer body; a second internal electrode layer on a corresponding one of the plurality of ceramic layers and located inside the multilayer body; a first external electrode including a first underlying electrode layer on the first end surface; and a second external electrode including a second underlying electrode layer on the second end surface. The first underlying electrode layer and the second underlying electrode layer each include a metal component and a glass component. The glass component includes Zr and Ba. A Zr/Ba atomic number ratio is not less than about 0.03 and not greater than about 0.15, the Zr/Ba atomic number ratio being obtained by a WDX quantitative analysis in a cross-section orthogonal or substantially orthogonal to a direction of a surface of a surface layer of each of the first underlying electrode layer and the second underlying electrode layer, the surface facing outward. The first underlying electrode layer and the second underlying electrode layer each have a glass-occupied area ratio of not less than about 18% in the cross-section. In a SEM image in the cross-section, an average length of the glass component on an imaginary line is not greater than about 0.92 μm, the imaginary line being parallel or substantially parallel to the surface of the surface layer of each of the first underlying electrode layer and the second underlying electrode layer about 3 μm inside of the surface layer of each of the first underlying electrode layer and the second underlying electrode layer.

In a multilayer ceramic electronic component according to a preferred embodiment of the present invention, the first underlying electrode layer and the second underlying electrode layer each include a metal component and a glass component. The glass component includes Zr and Ba, a Zr/Ba atomic number ratio by a WDX quantitative analysis in a cross-section orthogonal or substantially orthogonal to a direction of a surface of a surface layer of each of the first underlying electrode layer and the second underlying electrode layer, the surface facing outward, is not less than about 0.03 and not greater than about 0.15. The first underlying electrode layer and the second underlying electrode layer each have a glass-occupied area ratio of not less than about 18% in the cross-section. In a SEM image in the cross-section, an average length of the glass component on an imaginary line, which is parallel or substantially parallel to the surface of the surface layer of each of the first underlying electrode layer and the second underlying electrode layer about 3 μm inside of the surface layer of each of the first underlying electrode layer and the second underlying electrode layer, is not greater than about 0.92 μm. Accordingly, erosion of the glass composition by a plating solution can be prevented during plating of the external electrode, and a decrease in mechanical strength can be reduced or prevented. The moisture resistance reliability of the multilayer ceramic capacitor can thus be improved.

A method of manufacturing a multilayer ceramic electronic component according to a preferred embodiment of the present invention including a multilayer body including a stack of a plurality of ceramic layers and including a first main surface and a second main surface facing each other in a stacking direction, a first lateral surface and a second lateral surface facing each other in a width direction orthogonal or substantially orthogonal to the stacking direction, and a first end surface and a second end surface facing each other in a length direction orthogonal or substantially orthogonal to the stacking direction and the width direction, a first internal electrode layer on a corresponding one of the plurality of ceramic layers and located inside the multilayer body, a second internal electrode layer on a corresponding one of the plurality of ceramic layers and located inside the multilayer body, a first external electrode including a first underlying electrode layer on the first end surface, and a second external electrode including a second underlying electrode layer on the second end surface, includes preparing the multilayer body; preparing a conductive paste for the first underlying electrode layer, the conductive paste including a metal component and a glass component; preparing a conductive paste for the second underlying electrode layer, the conductive paste including the metal component and a glass component; applying the conductive paste for the first underlying electrode layer onto the first end surface of the multilayer body; applying the conductive paste for the second underlying electrode layer onto the second end surface of the multilayer body; baking the conductive paste for the first underlying electrode layer applied on the first end surface; and baking the conductive paste for the second underlying electrode layer applied on the second end surface. In the preparation of the conductive paste for the first underlying electrode layer which includes the metal component and the glass component, $ZrO_2$ powder is added separately from the metal powder and the glass powder included in the conductive paste for the first underlying electrode layer. In the preparation of the conductive paste for the second underlying electrode layer which includes the metal component and the glass component, $ZrO_2$ powder is added separately from the metal powder and the glass powder included in the conductive paste for the second underlying electrode layer. The metal component included in each of the conductive paste for the first underlying electrode layer and the conductive paste for the second underlying electrode layer has a central grain size of not less than about 0.2 μm and not greater than about 2.0 μm. The glass component included in each of the conductive paste for the first underlying electrode layer and the conductive paste for the second underlying electrode layer includes Ba, a glass volume fraction is not less than about 20 vol %, and a Zr content obtained by converting $ZrO_2$ powder as a glass component is not less than about 3 mol % and not greater than about 5 mol %.

According to a method of manufacturing a multilayer ceramic electronic component a multilayer ceramic electronic component according to a preferred embodiment of the present invention, in the preparation of the conductive paste for the first underlying electrode layer which includes the metal component and the glass component, $ZrO_2$ powder is added separately from the metal powder and the glass powder included in the conductive paste for the first underlying electrode layer. In the preparation of the conductive paste for the second underlying electrode layer which includes the metal component and the glass component, $ZrO_2$ powder is added separately from the metal powder and the glass powder included in the conductive paste for the second underlying electrode layer. The metal component included in each of the conductive paste for the first underlying electrode layer and the conductive paste for the second underlying electrode layer has a central grain size of not less than about 0.2 μm and not greater than about 2.0 μm. The glass component included in each of the conductive paste for the first underlying electrode layer and the conductive paste for the second underlying electrode layer includes Ba. A glass volume fraction is not less than about 20 vol %, and a Zr content obtained by converting $ZrO_2$ powder as a glass component is not less than about 3 mol % and not greater than about 5 mol %. Thus, a glass viscosity during sintering can be kept low by separately adding $ZrO_2$ compared with a case where $ZrO_2$ is directly included in glass powder, and a role of glass as an aid is not impaired. This can prevent inhibition of sintering of the conductive paste for the underlying electrode layer while increasing an erosion resistance of the glass in the external electrode, enabling densification.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

1. Multilayer Ceramic Capacitor

Description will be provided of a multilayer ceramic capacitor as an example of a multilayer ceramic electronic component according to Preferred Embodiment 1 of the present invention.

Figure 1:
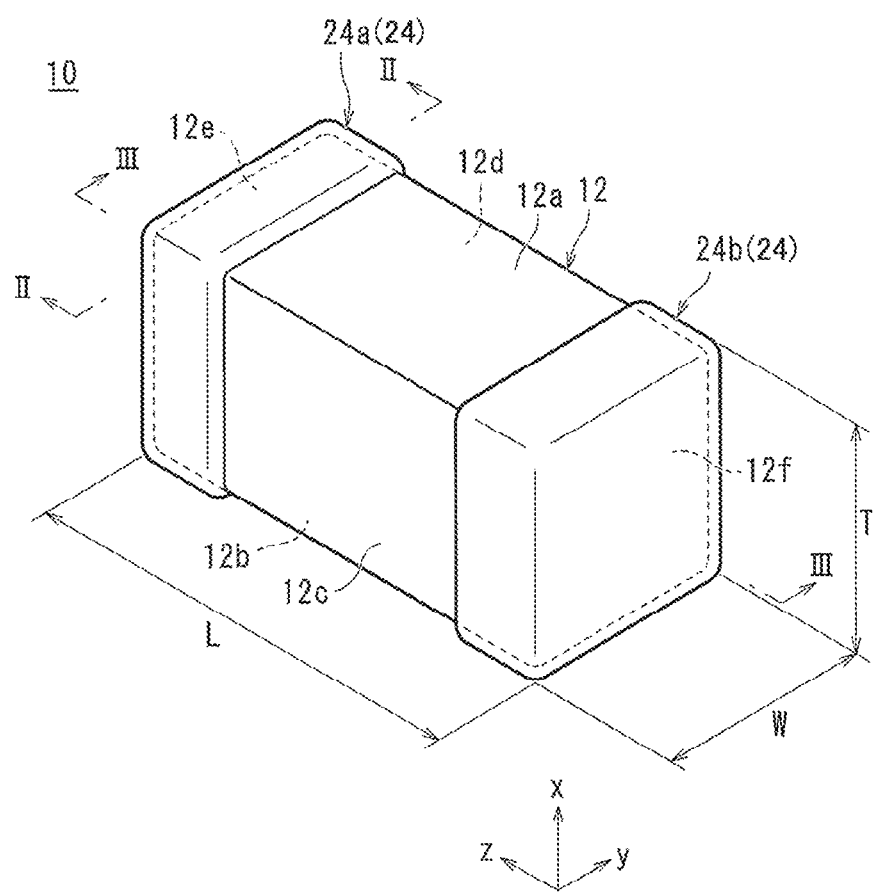
FIG. 1 is an external perspective view of a multilayer ceramic capacitor as an example of a multilayer ceramic electronic component according to a preferred embodiment of the present invention.
Figure 2:
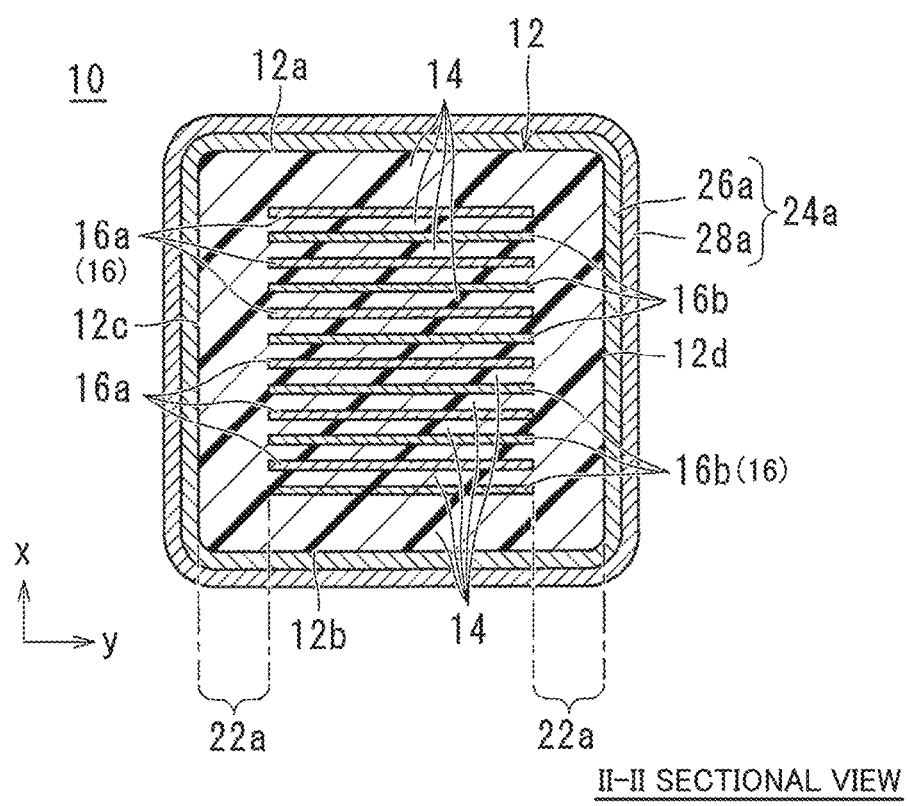
FIG. 2 is a sectional view taken along the line II-II of FIG. 1.
Figure 3:
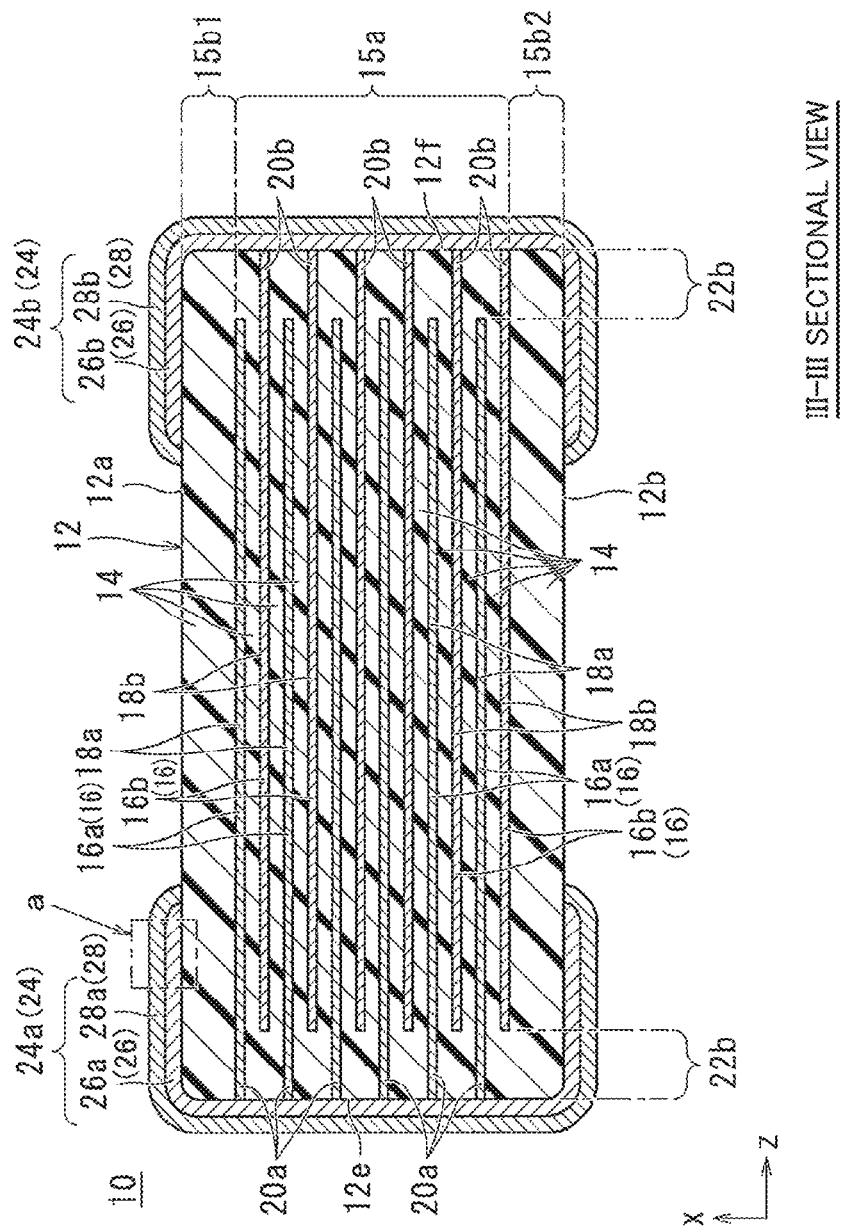
FIG. 3 is a sectional view taken along the line III-III of FIG. 1.

FIG. 1 is an external perspective view of the multilayer ceramic capacitor as an example of the multilayer ceramic electronic component according to Preferred Embodiment 1 of the present invention. FIG. 2 is a sectional view taken along the line II-II of FIG. 1. FIG. 3 is a sectional view taken along the line III-III of FIG. 1.

A multilayer ceramic capacitor 10, which is a multilayer ceramic electronic component, includes a multilayer body 12 and an external electrode 24, which is provided to multilayer body 12.

Multilayer Body

Multilayer body 12 includes a stack of a plurality of ceramic layers 14 and a plurality of internal electrode layers 16, and includes a first main surface 12a and a second main surface 12b facing each other in a stacking direction x, a first lateral surface 12c and a second lateral surface 12d facing each other in a width direction y orthogonal or substantially orthogonal to stacking direction x, and a first end surface 12e and a second end surface 12f facing each other in a length direction z orthogonal or substantially orthogonal to stacking direction x and width direction y.

Multilayer body 12 has a rectangular or substantially rectangular parallelepiped shape and includes rounded corners and rounded ridge portions. The corner refers to a portion at which three surfaces of multilayer body 12 meet together, and the ridge portion refers to a portion at which two surfaces of multilayer body 12 meet together. For example, a protrusion or recess may be provided on a portion or all of main surfaces 12a, 12b, lateral surfaces 12c, 12d, and end surfaces 12e, 12f.

A ceramic material may preferably be, for example, dielectric ceramic including $BaTiO_3$, $CaTiO_3$, $SrTiO_3$, or $CaZrO_3$ as a main component. Alternatively, the ceramic material may be a material including, for example, a Mn compound, an Fe compound, a Cr compound, a Co compound, or a Ni compound as a subcomponent in addition to the above main component.

When piezoelectric ceramic is used for multilayer body 12, the multilayer ceramic electronic component defines and functions as a ceramic piezoelectric element. A specific example of the piezoelectric ceramic material is a lead zirconate titanate (PZT)-based ceramic material.

When semiconductor ceramic is used for multilayer body 12, the multilayer ceramic electronic component defines and functions as a thermistor element. A specific example of the semiconductor ceramic material is a spinel-based ceramic material.

When magnetic ceramic is used for multilayer body 12, the multilayer ceramic electronic component defines and functions as an inductor element. When the multilayer ceramic component defines and functions as an inductor element, the internal electrode layer defines and functions as a coil-shaped conductor. A specific example of the magnetic ceramic material is a ferrite ceramic material.

In other words, the multilayer ceramic electronic component according to the present preferred embodiment can preferably define and function not only as multilayer ceramic capacitor 10, but also as a ceramic piezoelectric element, a thermistor element, or an inductor element by appropriately changing the material and structure of multilayer body 12.

As shown in FIGS. 2 and 3, multilayer body 12 includes, in stacking direction x connecting first main surface 12a with second main surface 12b, an effective layer portion 15a in which internal electrode layers 16 face each other, a first outer layer portion 15b1 including a plurality of ceramic layers 14 located between first main surface 12a and internal electrode layer 16 closest to first main surface 12a, and a second outer layer portion 15b2 including a plurality of ceramic layers 14 located between second main surface 12b and internal electrode layer 16 closest to second main surface 12b.

First outer layer portion 15b1 is located on the first main surface 12a side of multilayer body 12 and includes a plurality of ceramic layers 14 located between first main surface 12a and internal electrode layer 16 closest to first main surface 12a.

Second outer layer portion 15b2 is located on the second main surface 12b side of multilayer body 12 and includes a plurality of ceramic layers 14 located between second main surface 12b and internal electrode layer 16 closest to second main surface 12b.

A region sandwiched between first outer layer portion 15b1 and second outer layer portion 15b2 is effective layer portion 15a. Although the number of ceramic layers 14 stacked is not particularly limited, not less than 15 and not greater than 700 ceramic layers 14, for example, are preferably provided including first outer layer portion 15b1 and second outer layer portion 15b2 (also including external layers). Ceramic layer 14 preferably has a thickness of not less than about 0.5 μm and not greater than about 10 μm, for example.

Although the dimensions of multilayer body 12 are not particularly limited, preferably, a dimension L is not less than about 0.2 mm and not greater than about 10 mm, a dimension W is not less than about 0.1 mm and not greater than about 10 mm, and a dimension T is not less than about 0.1 mm and not greater than about 5 mm.

Internal Electrode Layer

Internal electrode layer 16 includes a plurality of first internal electrode layers 16a and a plurality of second internal electrode layers 16b as shown in FIGS. 2 and 3. First internal electrode layers 16a and second internal electrode layers 16b are alternately stacked with ceramic layer 14 between first internal electrode layer 16a and second internal electrode layer 16.

First internal electrode layer 16a is disposed on a surface of ceramic layer 14. First internal electrode layer 16a includes a first facing portion 18a, which faces second internal electrode layer 16b, and a first extending portion 20a, which is located on one end side of first internal electrode layer 16a and extends from first facing portion 18a to first end surface 12e of multilayer body 12. First extending portion 20a includes an end extending to first end surface 12e to be exposed.

Although the shape of first facing portion 18a of first internal electrode layer 16a is not particularly limited, the shape is preferably rectangular or substantially rectangular in plan view, for example. First facing portion 18a may include a corner portion rounded or inclined (in a tapered shape) in plan view. Alternatively, the corner portion may have a tapered shape in plan view which is inclined in either direction.

Although the shape of first extending portion 20a of first internal electrode layer 16a is not particularly limited, the shape is preferably rectangular or substantially rectangular in plan view, for example. First extending portion 20a may include a corner portion rounded or inclined (in a tapered shape) in plan view. Alternatively, the corner portion may have a tapered shape in plan view which is inclined in either direction.

First facing portion 18a of first internal electrode layer 16a and first extending portion 20a of first internal electrode layer 16a may have the same or substantially the same width, or any one of these portions may have a smaller width.

Second internal electrode layer 16b is disposed on a surface of ceramic layer 14. Second internal electrode layer 16b includes a second facing portion 18b, which faces first internal electrode layer 16a, and a second extending portion 20b, which is located on one end side of second internal electrode layer 16b and extends from second facing portion 18b to second end surface 12f of multilayer body 12. Second extending portion 20b includes an end extending to second end surface 12f to be exposed.

Although the shape of second facing portion 18b of second internal electrode layer 16b is not particularly limited, the shape is preferably rectangular or substantially rectangular in plan view, for example. Second facing portion 18b may include a corner portion rounded or inclined (in a tapered shape) in plan view. Alternatively, the corner portion may have a tapered shape in plan view which is inclined in either direction.

Although the shape of second extending portion 20b of second internal electrode layer 16b is not particularly limited, the shape is preferably rectangular or substantially rectangular in plan view, for example. Second extending portion 20b may include a corner portion rounded or inclined (in a tapered shape) in plan view. Alternatively, the corner portion may have a tapered shape in plan view which is inclined in either direction.

Second facing portion 18b of second internal electrode layer 16b and second extending portion 20b of second internal electrode layer 16b may have the same or substantially the same width, or any one of these portions may have a smaller width.

As shown in FIG. 3, multilayer body 12 further includes an end portion (hereinafter referred to as "L gap") 22b between the end of first internal electrode layer 16a opposite to first extending portion 20a and second end surface 12f and between the end of second internal electrode layer 16b opposite to second extending portion 20b and first end surface 12e.

As shown in FIG. 2, multilayer body 12 includes a side portion (hereinafter referred to as "W gap") 22a between one end of each of first facing portion 18a and second facing portion 18b in width direction y and first side surface 12c and between the other end of each of first facing portion 18a and second facing portion 18b in width direction y and second side surface 12d.

First internal electrode layer 16a and second internal electrode layer 16b may preferably be made of, for example, any appropriate conductive material such as metals including Ni, Cu, Ag, Pd, and Au or an alloy including at least one of these metals, such as a Ag—Pd alloy. Internal electrode layer 16 may further include dielectric particles based on the same composition as ceramic included in ceramic layer 14.

Internal electrode layer 16, that is, each of first internal electrode layer 16a and second internal electrode layer 16b, preferably has a thickness of not less than about 0.2 μm and not greater than about 2.0 μm, for example.

Not less than 15 and not greater than 200 first internal electrode layers 16a and second internal electrode layers 16b are preferably provided in total, for example.

External Electrode

External electrode 24 is disposed on the first end surface 12e side and the second end surface 12f side of multilayer body 12, as shown in FIGS. 1 and 3.

External electrode 24 includes an underlying electrode layer 26 and a plating layer 28, which covers underlying electrode layer 26.

External electrode 24 includes a first external electrode 24a and a second external electrode 24b.

First external electrode 24a is electrically connected with first extending portion 20a of first internal electrode layer 16a and is disposed on first end surface 12e. First external electrode 24a may also be disposed on a portion of first main surface 12a and a portion of second main surface 12b, and a portion of first lateral surface 12c and a portion of second lateral surface 12d. In the present preferred embodiment, first external electrode 24a extends from first end surface 12e to a portion of first main surface 12a and a portion of second main surface 12b, and a portion of first lateral surface 12c and a portion of second lateral surface 12d.

Second external electrode 24b is electrically connected with second extending portion 20b of second internal electrode layer 16b and is disposed on second end surface 12f. Second external electrode 24b may also be disposed on a portion of first main surface 12a and a portion of second main surface 12b, and a portion of first lateral surface 12c and a portion of second lateral surface 12d. In the present preferred embodiment, second external electrode 24b extends from second end surface 12f to a portion of first main surface 12a and a portion of second main surface 12b, and a portion of first lateral surface 12c and a portion of second lateral surface 12d.

In multilayer body 12, first facing portion 18a of first internal electrode layer 16a and second facing portion 18b of second internal electrode layer 16b face each other with ceramic layer 14 between first facing electrode portion 18a and second facing electrode portion 18b, thus generating a capacitance. A capacitance can thus be obtained between first external electrode 24a connected with first internal electrode layer 16a and second external electrode 24b connected with second internal electrode layer 16b. Accordingly, the characteristics of the capacitor are provided.

Underlying Electrode Layer

Underlying electrode layer 26 includes a first underlying electrode layer 26a and a second underlying electrode layer 26b.

First underlying electrode layer 26a is disposed on the first end surface 12e side of multilayer body 12 and extends from first end surface 12e to a portion of first main surface 12a and a portion of second main surface 12b, and a portion of first lateral surface 12c and a portion of second lateral surface 12d.

Second underlying electrode layer 26b is disposed on the second end surface 12f side of multilayer body 12 and extends from second end surface 12f to a portion of first main surface 12a and a portion of second main surface 12b, and a portion of first lateral surface 12c and a portion of second lateral surface 12d.

First underlying electrode layer 26a and second underlying electrode layer 26b each include a metal component and a glass component.

Thus, multilayer ceramic capacitor 10 as the multilayer ceramic electronic component according to the present preferred embodiment has the following configuration.

Figure 4:
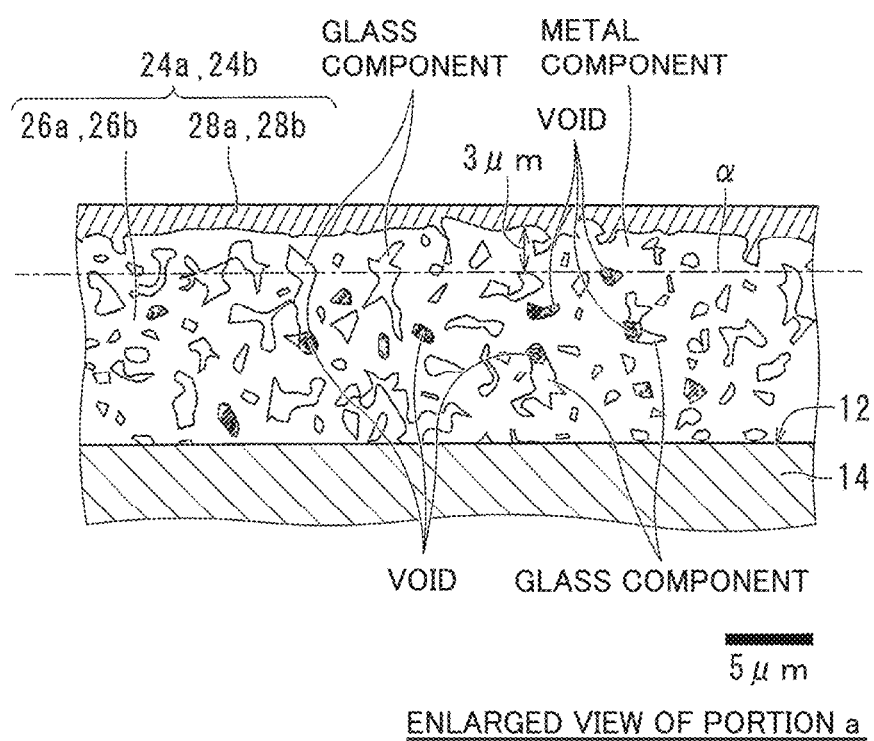
FIG. 4 is an enlarged sectional view of a main portion, which shows a portion a of FIG. 3.

Description will be provided particularly with reference to FIG. 4. FIG. 4 is an enlarged sectional view of a main portion, which shows a portion a of FIG. 3. In the enlarged sectional view of the main portion showing the portion a of FIG. 4, first underlying electrode layer 26a and second underlying electrode layer 26b each include metal components, glass components, and voids. The glass components are distributed continuously into metal components, and the voids are scattered in a mix of the glass component and the metal component.

The glass component of each of first underlying electrode layer 26a and second underlying electrode layer 26b preferably includes Zr and Ba, for example. A Zr/Ba atomic number ratio is preferably, for example, not less than about 0.03 and not greater than about 0.15 in a cross-section of multilayer ceramic capacitor 10. The Zr/Ba atomic number ratio is obtained by a WDX quantitative analysis in a cross-section orthogonal or substantially orthogonal to the direction of a surface of a surface layer of each of first underlying electrode layer 26a and second underlying electrode layer 26b, the surface facing outward. First underlying electrode layer 26a and second underlying electrode layer 26b each preferably have a glass-occupied area ratio of, for example, not less than about 18% in the cross-section (see FIG. 4) of multilayer ceramic capacitor 10. Further, in a SEM image (an image taken by a scanning electron microscope) in the cross-section (see FIG. 4) of multilayer ceramic capacitor 10, an average length of the glass component on an imaginary line α, which is parallel or substantially parallel to the surface of the surface layer of each of first underlying electrode layer 26a and second underlying electrode layer 26b about 3 μm inside of the surface layer of each of first underlying electrode layer 26a and second underlying electrode layer 26b, is preferably not greater than about 0.92 μm, for example.

Thus, in preferred embodiments of the present invention, a glass viscosity during sintering can be kept low by separately adding $ZrO_2$ compared with the case where $ZrO_2$ is directly included in glass powder, and the role of glass as an aid is not impaired. This can restrain inhibition of sintering of the conductive paste for the underlying electrode layer while increasing an erosion resistance of the glass in external electrode 24, enabling densification. As a result, even when the thickness of external electrode 24 is decreased in a small-size, large-capacitance electronic component as a multilayer ceramic capacitor, erosion of a glass composition by a plating solution can be reduced or prevented during plating for the formation of external electrode 24, thus reducing or preventing a decrease in mechanical strength. This can improve the moisture resistance reliability of the multilayer ceramic capacitor.

More specifically, the following advantageous effects can be achieved.

(1) The glass component of each of first underlying electrode layer 26a and second underlying electrode layer 26b includes Zr and Ba, and in a cross-section of multilayer ceramic capacitor 10, the Zr/Ba atomic number ratio is not less than about 0.03 and not greater than about 0.15, for example, the Zr/Ba atomic number ratio being obtained by a WDX quantitative analysis in a cross-section orthogonal or substantially orthogonal to the direction of the surface of the surface layer of each of first underlying electrode layer 26a and second underlying electrode layer 26b, the surface facing outward. This achieves a state in which $ZrO_2$, which is a component of high erosion resistance, is dissolved in glass in a solid solution state without reducing or preventing the densification of external electrode 24 after sintering, leading to an increased resistance to dissolving in the plating solution in application of a plating layer onto the first underlying electrode layer and the second underlying electrode layer.

(2) When first underlying electrode layer 26a and second underlying electrode layer 26b each have a glass-occupied area ratio of, for example, not less than about 18% in a cross-section of multilayer ceramic capacitor 10, an amount of glass included in each of first underlying electrode layer 26a and second underlying electrode layer 26b increases to reduce or prevent inhibition of sintering of a conductive paste by $ZrO_2$, thus resulting in densified external electrode 24.

(3) In a SEM image in a cross-section of multilayer ceramic capacitor 10, an upper limit of an average length of the glass component on imaginary line α, which is parallel or substantially parallel to the surface of the surface layer of each of first underlying electrode layer 26a and second underlying electrode layer 26b about 3 μm inside of the surface layer of each of first underlying electrode layer 26a and second underlying electrode layer 26b, is not less than about 0.58 μm and not greater than about 0.92 μm, for example.

When an average length of the glass component is not greater than about 0.92 μm, an area of exposed glass can be decreased in the front surface of external electrode 24 which is subjected to erosion by water or a plating solution, thus reducing an amount of elution to the plating solution and increasing a compressive stress to glass. This can also reduce or prevent corrosion cracking due to stress concentration, thus reducing or preventing the occurrence of cracks caused by elution.

When a lower limit of an average length of the glass component is not less than about 0.58 μm, a structure with continuously mixed glass and Cu can be maintained, and glass is not divided by Cu. This achieves an adhesion property to ceramic layer 14.

A glass-occupied area ratio in a cross-section is measured, for example, by the following method.

Specifically, in the method of measuring a glass-occupied area ratio in a cross-section, a surface at a position with about ½ W of multilayer ceramic capacitor 10 in width direction y is exposed by machine polishing. Subsequently, a cross-sectional portion of external electrode 24 is observed using reflected electrons of the SEM at 3000-times magnification, and the cross-sectional portion is subjected to ternarization into a dark color portion corresponding to a void, a bright color portion corresponding to a metal component, and a neutral color portion corresponding to a glass component in the external electrode 24 portion of the obtained image. Subsequently, a ratio of an area of the neutral color portion to a total area of the dark color portion, the bright color portion, and the neutral color portion is calculated.

An average of a glass length at a position about 3 μm from the surface layer of underlying electrode layer 26 is measured, for example, by the following method.

Specifically, in the method of measuring an average of the glass length at a position about 3 μm from the surface layer of underlying electrode layer 26, a surface at a position with about ½ W of multilayer ceramic capacitor 10 in width direction y is exposed by mechanical polishing. Subsequently, a cross-sectional portion of external electrode 24 is observed using reflected electrons of the SEM at 3000-times magnification, and an image is obtained such that the surface of external electrode 24 crosses the opposite ends of the image. Subsequently, an imaginary line connecting intersection points of the opposite ends of external electrode 24 and the right and left sides of the image is drawn, and an image at a position (imaginary line α in FIG. 4) to which the imaginary line is moved toward the body is cut as a linear image. Then, the obtained linear image is subjected to binarization into a dark color portion corresponding to a glass component and a void and a bright color portion corresponding to a metal component, the length of the dark color portion cut into small pieces is measured, and an average of the length of the dark color portion is calculated.

Each of first underlying electrode layer 26a and second underlying electrode layer 26b preferably has a cross-sectional porosity of, for example, not greater than about 6% in a cross-section of multilayer ceramic capacitor 10. This prevents water or a plating solution from directly passing through external electrode 24 into multilayer ceramic capacitor 10, resulting in highly reliable multilayer ceramic capacitor 10.

A cross-sectional porosity is measured, for example, by the following method.

Specifically, in the method of measuring a cross-sectional porosity, a surface at a position with about ½ W of multilayer ceramic capacitor 10 in width direction y is exposed by mechanical polishing. Subsequently, a cross-sectional portion of external electrode 24 is observed using reflected electrons of the SEM at 3000-times magnification, and the cross-sectional portion is subjected to binarization into a dark color portion corresponding to a void and a bright color portion corresponding to a metal component and a glass component in the external electrode 24 portion of the obtained image. Then, a ratio of an area of the dark color portion to a total area of the dark color portion and the bright color portion is calculated.

The metal of each of first underlying electrode layer 26a and second underlying electrode layer 26b includes, for example, at least one selected from Cu, Ni, Ag, Pd, Ag—Pd alloy, Au, and the like.

Multiple first underlying electrode layers 26a and multiple second underlying electrode layers 26b may be provided.

Although the thicknesses of first underlying electrode layer 26a and second underlying electrode layer 26b in width direction y, connecting first end surface 12e with second end surface 12f, at central portions of first underlying electrode layer 26a and second underlying electrode layer 26b located in first main surface 12a and second main surface 12b in stacking direction x, connecting first main surface 12a with second main surface 12b, are not particularly limited, the thicknesses are preferably not less than about 15 μm and not greater than about 160 μm, for example.

When first underlying electrode layer 26a and second underlying electrode layer 26b are provided on a portion of first main surface 12a and a portion of second main surface 12b, and a portion of first lateral surface 12c and a portion of second lateral surface 12d, the thicknesses of first underlying electrode layer 26a and second underlying electrode layer 26b in stacking direction x, connecting first main surface 12a with second main surface 12b, at central portions of first underlying electrode layer 26a and second underlying electrode layer 26b located on first main surface 12a and second main surface 12b, first lateral surface 12c and second lateral surface 12d in length direction z, connecting first end surface 12e with second end surface 12f, are preferably not less than about 5 μm and not greater than about 40 μm, for example.

Plating Layer

Plating layer 28 includes a first plating layer 28a and a second plating layer 28b.

First plating layer 28a covers first underlying electrode layer 26a.

Second plating layer 28b covers second underlying electrode layer 26b.

Plating layer 28 may include multiple layers.

Plating layer 28 preferably includes a lower plating layer covering underlying electrode layer 26 and an upper plating layer covering the lower plating layer.

Plating layer 28 includes, for example, at least one selected from Cu, Ni, Ag, Pd, Ag—Pd alloy, Au, and the like.

Plating layer 28 preferably has, for example, a two-layer structure including a Ni plating layer as the lower plating layer and a Sn plating layer as the upper plating layer. The Ni plating layer can reduce or prevent erosion of underlying electrode layer 26 by solder in mounting of multilayer ceramic capacitor 10. The Sn plating layer can improve wettability of solder in mounting of multilayer ceramic capacitor 10, leading to easy mounting.

The thickness of every plating layer 28 is preferably not less than about 2 μm and not greater than about 15 μm, for example.

The dimension in length direction z of multilayer ceramic capacitor 10 including multilayer body 12, first external electrode 24a, and second external electrode 24b is referred to as an L dimension, the dimension in height direction x of multilayer ceramic capacitor 10 including multilayer body 12, first external electrode 24a, and second external electrode 24b is referred to as a T dimension, and the dimension in width direction y of multilayer ceramic capacitor 10 including multilayer body 12, first external electrode 24a, and second external electrode 24b is referred to as a W dimension. The L dimension of multilayer ceramic capacitor 10 in length direction z is preferably not less than about 0.2 mm and not greater than about 3.5 mm, for example.

The T dimension of multilayer ceramic capacitor 10 in stacking direction x is preferably not less than about 0.05 mm and not greater than about 2.7 mm, for example.

The W dimension of multilayer ceramic capacitor 10 in width direction y is preferably not less than about 0.1 mm and not greater than about 2.7 mm, for example.

2. Method of Manufacturing Multilayer Ceramic Electronic Component

A non-limiting example of a method of manufacturing a multilayer ceramic capacitor as an example of the multilayer ceramic electronic component according to the present preferred embodiment will be described below.

(1) First, dielectric sheets for forming ceramic layer 14 and a conductive paste for the internal electrode layer forming internal electrode layer 16 are prepared. The dielectric sheet and the conductive paste for internal electrode layer include a binder and a solvent. Publicly known binder and solvent may be used, for example.

(2) Subsequently, the conductive paste for internal electrode layer is printed on the dielectric sheet in a predetermined pattern by, for example, screen printing or gravure printing, to thus form an internal electrode pattern. Specifically, a paste made of a conductive material is applied onto the dielectric sheet by a method such as the above-mentioned printing, for example, to thus form a conductive paste layer. The paste made of a conductive material is obtained by, for example, addition of an organic binder and an organic solvent to powdered metal. Regarding the dielectric sheets, outer-layer dielectric sheets for outer layer, that is, for the formation of first outer layer portion 15b1 and second outer layer portion 15b2, each of which includes no internal electrode pattern printed thereon, are also produced.

(3) The dielectric sheets prepared in the step (2) above are used to produce a multilayer sheet. Specifically, a multilayer sheet is produced by stacking a predetermined number of dielectric sheets for outer layer, each of which includes no internal electrode pattern formed thereon to form a portion that functions as second outer layer portion 15b2, alternately stacking thereon the dielectric sheets, each of which includes thereon an internal electrode pattern corresponding to first internal electrode layer 16a, and dielectric sheets, each of which includes thereon an internal electrode pattern corresponding to second internal electrode layer 16b, and further stacking a predetermined number of dielectric sheets for outer layer, each of which includes no internal electrode pattern formed thereon to form a portion that functions as internal layer portion 15a.

(4) The multilayer sheet is pressed in the stacking direction by, for example, isostatic pressing, to thus produce a multilayer block.

(5) The multilayer block is cut in a predetermined size, to thus cut out multilayer chips. In this case, corners and ridge portions of the multilayer chips may be rounded by, for example, barrel polishing. The steps of (1) to (5) correspond to a step of preparing multilayer body 12.

(6) Subsequently, the multilayer chip is fired to produce multilayer body 12. The firing temperature depends on the materials of the dielectric body and internal electrode layer 16, which is preferably not lower than about 900° C. and not higher than about 1400° C., for example.

(7) The conductive paste for the first underlying electrode layer which includes a metal component and a glass component and the conductive paste for the second underlying electrode layer which includes a metal component and a glass component are prepared. Herein, the same conductive paste is prepared as the conductive paste for the first underlying electrode layer and the conductive paste for the second underlying electrode layer.

Specifically, the conductive pastes for forming first underlying electrode layer 26a and second underlying electrode layer 26b are prepared by, first, mixing a metal component, a glass component, a resin component, and a solvent.

In the step of preparing the conductive paste for the first underlying electrode layer which includes a metal component and a glass component and the conductive paste for the second underlying electrode layer which includes a metal component and a glass component, $ZrO_2$ powder is added separately from the metal powder and the glass powder included in the conductive paste for the first underlying electrode layer and the conductive paste for the second underlying electrode layer.

The metal component included in the conductive paste for the first underlying electrode layer and the conductive paste for the second underlying electrode layer has a central grain size of not less than about 0.2 μm and not greater than about 2.0 μm, for example. The glass component included in the conductive paste for the first underlying electrode layer and the conductive paste for the second underlying electrode layer includes Ba, and a glass volume fraction is not less than about 20 vol %, and a content of Zr, which is obtained by converting $ZrO_2$ powder as a glass component, is not less than 3 mol % and not greater than about 5 mol %, for example.

Herein, the central grain size of the metal component included in the conductive paste is set to, for example, not less than about 0.2 μm and not greater than about 2.0 μm, which reduces a situation in which minute metal powder divides a continuous layer of glass of the underlying electrode layer and a crack caused by, for example, dissolving of a glass component by water or a plating solution accordingly propagates through a ceramic body.

Alternatively, in the addition of $ZrO_2$ powder, the metal powder included in the conductive paste may be coated with about $ZrO_2$ powder, for example. As a result, $ZrO_2$ powder is homogeneously dispersed in a paste, and dissolving of $ZrO_2$ powder and glass in a solid solution state homogenously advances. This can reduce a local shortage of $ZrO_2$, resulting in improvements in a resistance to dissolving.

(8) The conductive paste for the underlying electrode layer which has been manufactured by the above manufacturing method is applied onto the opposite end surfaces 12e, 12f of multilayer body 12, to thus form underlying electrode layer 26. For example, underlying electrode layer 26 is formed by applying the conductive paste onto the opposite end surfaces 12e, 12f of multilayer body 12 by dipping, screen printing, or the like, and then baking the conductive paste. The baking temperature in this case is preferably not lower than about 700° C. and not higher than about 900° C., for example.

(9) The surface of underlying electrode layer 26 is plated to form plating layer 28, as necessary. In the present preferred embodiment, plating layer 28 is formed in two layers on the surface of underlying electrode layer 26. Specifically, a Ni plating layer (lower plating layer) and a Sn plating layer (upper plating layer) are formed on underlying electrode layer 26. The Ni plating layer (lower plating layer) and the Sn plating layer (upper plating layer) are successively formed by, for example, barrel plating.

With the above configuration, advantageous effects of the components of multilayer ceramic capacitor 10 are achieved as follows.

(1) The glass component of each of first underlying electrode layer 26a and second underlying electrode layer 26b includes Zr and Ba. A Zr/Ba atomic number ratio is not less than about 0.03 and not greater than about 0.15 in a cross-section of multilayer ceramic capacitor 10. The Zr/Ba atomic number ratio is obtained by a WDX quantitative analysis in a cross-section orthogonal or substantially orthogonal to the direction of a surface of a surface layer of each of first underlying electrode layer 26a and second underlying electrode layer 26b, the surface facing outward. As a result, a state in which $ZrO_2$ being a component of a high erosion resistance is dissolved in glass in a solid solution state is obtained without inhibiting the densification of external electrode 24 after sintering, leading to an increased resistance to dissolving in a plating solution in application of plating layer 28 onto first underlying electrode layer 26a and second underlying electrode layer 26b.

(2) First underlying electrode layer 26a and second underlying electrode layer 26b each have a glass-occupied area ratio of not less than about 18% in a cross-section of multilayer ceramic capacitor 10. This increases an amount of glass included in each of first underlying electrode layer 26a and second underlying electrode layer 26b to reduce or prevent inhibition of sintering of the conductive paste by $ZrO_2$, thus resulting in densified external electrode 24.

(3) In a SEM image in the cross-section of multilayer ceramic capacitor 10, an average length of the glass component on an imaginary line α, which is parallel or substantially parallel to the surface of the surface layer of each of first underlying electrode layer 26a and second underlying electrode layer 26b about 3 μm inside of the surface layer of each of first underlying electrode layer 26a and second underlying electrode layer 26b, is not greater than about 0.92

μm. Thus, an area of exposed glass is decreased in the surface of external electrode 24 that is subjected to erosion by water or a plating solution, so as to reduce an amount of elution to the plating solution and increase a compressive stress to glass. This can also reduce or prevent corrosion cracking due to stress concentration, thus reducing or preventing the occurrence of cracks caused by elution.

Variations

Variations of the present preferred embodiment will be described below. In these variations, components equivalent to those of the above preferred embodiment are denoted by the same reference character and will not be described repeatedly in detail.

Figure 5A:
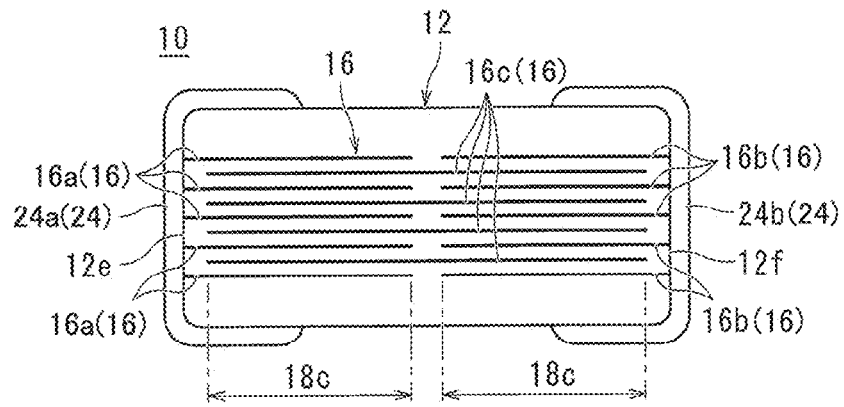
FIG. 5A is a sectional view taken along the line II-II of FIG. 1, which shows a structure in which a facing portion of an internal electrode layer of a multilayer ceramic capacitor as an example of a multilayer ceramic electronic component according to a preferred embodiment of the present invention is divided into two portions.
Figure 5B:
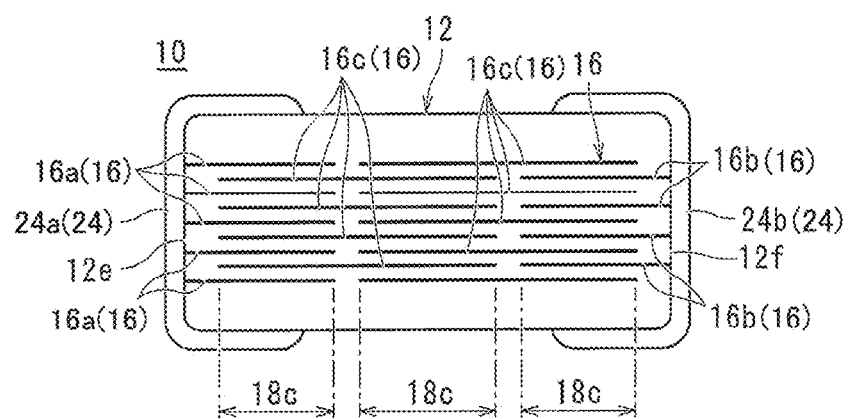
FIG. 5B is a sectional view taken along the line II-II of FIG. 1, which shows a structure in which a facing portion of an internal electrode layer of a multilayer ceramic capacitor as an example of a multilayer ceramic electronic component according to a preferred embodiment of the present invention is divided into three portions.
Figure 5C:
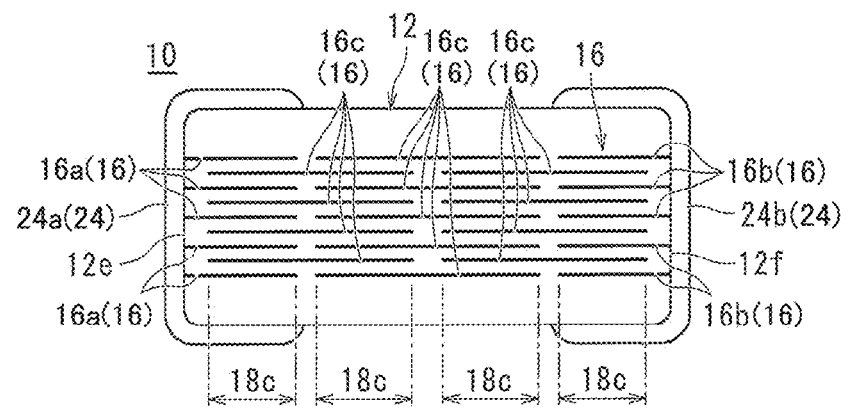
FIG. 5C is a sectional view taken along the line II-II of FIG. 1, which shows a structure in which a facing portion of an internal electrode layer of a multilayer ceramic capacitor as an example of a multilayer ceramic electronic component according to a preferred embodiment of the present invention is divided into four portions.

Specifically, as shown in FIGS. 5A to 5C, floating internal electrodes 16c, which extend to neither first end surface 12e nor second end surface 12f, may be provided in addition to first internal electrode layers 16a and second internal electrode layers 16b, and floating internal electrodes 16c may divide the facing portions (18a, 18b) into multiple portions. For example, the above structure may be a dual-linked structure (see FIG. 5A), a triple-linked structure (see FIG. 5B), a quadruple-linked structure (see FIG. 5C), and further, a quadruple-and-more-linked structure. With the structure in which the facing portions are divided into multiple portions as described above, multiple capacitor components are provided between facing internal electrode layers 16, resulting in a configuration in which these capacitor components are connected in series. As a result, a voltage applied to each capacitor component decreases, leading to a higher breakdown voltage of multilayer ceramic capacitor 10.

3. Experimental Example

An experimental example according to the present preferred embodiment will be described below. Note that the experimental example does not limit the present invention.

The manufacturing method according to the above preferred embodiment was used to produce a multilayer ceramic capacitor shown in FIGS. 1 to 4 as the multilayer ceramic electronic component, and a moisture resistance reliability test and an adhesion test were conducted.

In the experimental example, samples of Examples 1 to 4 and Comparative Examples 1 to 5 were prepared.

The specifications of the multilayer ceramic capacitors produced in the experimental example are as follows.

Note that in Examples 1 to 4, a $ZrO_2$ component was prepared as elemental $ZrO_2$ powder and was separately added to glass powder during blending of a paste so as to obtain a predetermined molar ratio as shown in Table 1.

Dimensions of multilayer ceramic capacitor: L×W× T=about 0.60 mm×about 0.30 mm×about 0.30 mm Material of ceramic: $BaTiO_3$
Capacitance: about 4 μF
Rated voltage: about 6.3 V
Material of internal electrode layer: Ni Structure of External Electrode Underlying electrode layer: containing conducting metal (Cu) and glass component Glass component: Zr, Ba as essential elements: see Table 1 for a content of Zr or the like.

Film thickness of central portion of end surface: about 20 μm

Structure of Plating Layer

Two-layer structure including Ni plating layer+Sn plating layer

Thickness of Ni plating layer: about 4 μm
Thickness of Sn plating layer: about 4 μm The specifications of the multilayer ceramic capacitors produced as the comparative examples are the same or substantially the same, except for an additive amount of $ZrO_2$ and a method of adding $ZrO_2$ in the step of producing a sample used in the experimental example.

Specifically, in Comparative Example 1, $ZrO_2$ powder was not added. In Comparative Example 2, $ZrO_2$ was separately added such that a content of Zr obtained by converting $ZrO_2$ powder as a glass component was about 10 mol. In Examples 3 to 5, glass was added such that a content of Zr obtained by converting $ZrO_2$ powder as a glass component was about 3 mol, about 5 mol, and about 10 mol, respectively.

Note that each of the adding methods regarding "separately adding" and "adding of glass" means the following.

Specifically, separately adding means the adding method performed by preparing a $ZrO_2$ component as elemental $ZrO_2$ powder and adding the $ZrO_2$ component to glass powder so as to obtain a predetermined molar ratio in blending of a paste.

Adding of glass means that, during manufacture of glass powder, a $ZrO_2$ component is mixed, melted, and pulverized as one of the glass raw materials before melting so as to obtain a predetermined molar fraction after melting, and then using the glass powder with compatibilized $ZrO_2$ as the glass component.

Method of Measuring $ZrO_2/(Glass+ZrO_2)$

A method of measuring $ZrO_2/(glass+ZrO_2)$ is as follows. Specifically, a content of Zr obtained by converting $ZrO_2$ powder as a glass component was obtained by quantifying the included composition of powder obtained by mixing $ZrO_2$ powder and glass powder at a predetermined ratio or glass powder containing $ZrO_2$ using an ICP-MS analysis and an atomic absorption method, and calculating as a molar ratio of an oxide.

Method of Measuring Zr/Ba Atomic Number Ratio

A method of measuring a Zr/Ba atomic number ratio is as follows. Specifically, a surface of a prepared sample of a multilayer ceramic capacitor at a position with about ½ W in width direction y was exposed by mechanical polishing. Subsequently, a cross-sectional portion of an external electrode was observed at 3000-times magnification or a higher magnification under the SEM, and in a field of view at the center or approximate center in stacking direction x and at the center or approximate center in the film thickness direction of the external electrode, and a point analysis was performed aiming at a glass-segregated portion, thus calculating a Zr/Ba atomic number ratio (atomic number ratio). Subsequently, the above measurement was performed at n=5 positions on different end surfaces, and an average was calculated.

Method of Measuring Average of Glass Length at Position about 3 μm from Surface Layer of Underlying Electrode Layer A method of measuring an average of a glass length at a position about 3 μm from a surface layer of an underlying electrode layer is as follows. Specifically, a surface of a prepared multilayer ceramic capacitor at a position at about ½ W in width direction y was exposed by mechanical polishing. Subsequently, a cross-sectional portion of the external electrode was observed using reflected electrons of the SEM at 3000-times magnification, and an image was obtained such that the surface of the external electrode crossed the opposite ends of the image. Subsequently, an imaginary line connecting intersection points of the opposite ends of the external electrode and the right and left sides of the image was drawn, and an image of a location (imaginary line α in FIG. 4) to which the imaginary line was moved about 3 μm toward a body was cut as a linear image. Subsequently, the obtained linear image was subjected to binarization into a dark color portion corresponding to a glass component and a void and a bright color portion corresponding to a metal component, a length of the dark color portion cut into small pieces was measured, and an average of the length of the dark color portion was calculated.

Method of Measuring Cross-Sectional Porosity

A method of measuring a cross-sectional porosity is as follows. Specifically, a surface of a prepared multilayer ceramic capacitor at a position of about ½ W in width direction y was exposed by mechanical polishing. Subsequently, a cross-sectional portion of an external electrode was observed using reflected electrons of the SEM at 3000-times magnification, the obtained image was subjected to binarization into a dark color portion corresponding to a void and a bright color portion corresponding to a metal component and a glass component in the external electrode portion of the obtained image, and a ratio of an area of the dark color portion to a total area of the dark color portion and the bright color portion was calculated.

Method of Measuring Glass-Occupied Area Ratio in Cross-Section

A method of measuring a glass-occupied area ratio in a cross-section is as follows. Specifically, a surface of a prepared multilayer ceramic capacitor at a position of about ½ W in width direction y was exposed by mechanical polishing. Subsequently, a cross-sectional portion of an external electrode was observed using reflected electrons of the SEM at 3000-times magnification, the obtained image was subjected to ternarization into a dark color portion corresponding to a void, a bright color portion corresponding to a metal component, and a neutral color portion corresponding to a glass component in the external electrode portion of the obtained image, and a ratio of an area of the neutral color portion to a total area of the dark color portion, the bright color portion, and the neutral color portion was calculated.

Test Method in Moisture Resistance Reliability Test

In the moisture resistance reliability test, a prepared multilayer ceramic capacitor was left for about 72 hours in conditions of a temperature of about 125° C., an applied voltage of about 3.2 V, and a humidity of about 95% RH. Subsequently, the sample which had already been applied with a load was taken out, an insulation resistance Log IR thereof was measured, and samples with Log IR smaller than about 4.0 were counted as not good. As a result of the test, a sample with no defect was rated as pass: G (good), and a sample with one or more defects was rated as fail: NG (not good), among 70 samples provided in the test of each example and each comparative example.

Test Method in Adhesion Test

An adhesion test was conducted by a tensile test of fixing a prepared multilayer ceramic capacitor to a head spin through soldering and pulling the multilayer ceramic capacitor at a tensile speed of about 0.5 mm/s with a tensile tester. Subsequently, when peeling occurred at an interface between the multilayer body and the external electrode of the multilayer ceramic capacitor, as a sample, were counted as not good. As a result of the test, a sample with no defect was rated as pass: G, and a sample with one or more defects was rated as fail: NG, among ten samples provided in the test.

Table 1 shows an outline of each example and each comparative example, and each test result.

TABLE 1

|  | EXAMPLE 1 | EXAMPLE 2 | EXAMPLE 3 | EXAMPLE 4 | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|---|---|---|---|
| METHOD OF ADDING $ZrO_2$ | SEPARATELY ADDED | SEPARATELY ADDED | SEPARATELY ADDED | SEPARATELY ADDED | NONE | SEPARATELY ADDED | GLASS ADDED | GLASS ADDED | GLASS ADDED |
| $ZrO_2$/(GLASS + $ZrO_2$) (mol/%) | 1 | 3 | 5 | 7 | 0 | 10 | 3 | 5 | 10 |
| Zr/Ba ATOMIC NUMBER RATIO | 0.03 | 0.05 | 0.10 | 0.15 | 0.00 | 0.20 | 0.05 | 0.05 | 0.20 |
| AVERAGE OF GLASS LENGTH (μm) | 0.92 | 0.81 | 0.76 | 0.58 | 1.60 | 0.41 | 1.10 | 1.20 | 1.40 |
| CROSS-SECTIONAL POROSITY (%) | 2 | 2 | 4 | 6 | 2 | 9 | 8 | 11 | 13 |
| GLASS-OCCUPIED AREA RATIO (%) | 19 | 19 | 18 | 18 | 16 | 16 | 17 | 17 | 17 |
| RESULT OF RELIABILITY TEST | G | G | G | G | NG | G | NG | NG | NG |
| RESULT OF ADHESION TEST | G | G | G | G | G | NG | G | G | NG |

Table 1 reveals that Zr/Ba atomic number ratios of the samples according to Examples 1 to 4 fall within the range of not less than about 0.03 and not greater than about 0.15. Also, in the samples according to Examples 1 to 4, a glass-occupied area ratio is not less than about 18%, and an average length of a glass component on an imaginary line α, which is parallel or substantially parallel to a surface layer of an underlying electrode layer about 3 μm inside of the surface layer of the underlying electrode layer, is not greater than about 0.92 μm. In addition, the samples according to Examples 1 to 4 have a cross-sectional porosity of not less than about 18%. Every sample passed the moisture resistance reliability test, and also, every sample passed the adhesion test.

In contrast, the sample according to Comparative Example 1 included a glass component in an underlying electrode layer but included $ZrO_2$ powder separately added or included no glass, and accordingly, had a relatively low cross-sectional porosity of about 2% and an average length of a glass component of about 1.6 μm, larger than about 0.92 μm, on an imaginary line α parallel or substantially parallel to a surface layer of an underlying electrode layer about 3 µm inside of the surface layer of the underlying electrode layer. The sample according to Comparative Example 1 thus passed the adhesion test but failed the moisture resistance test.

The sample according to Comparative Example 2 included $ZrO_2$ powder separately added, which was separately added such that a content of Zr obtained by converting $ZrO_2$ powder as a glass component was about 10 mol. The sample according to Comparative Example 2 accordingly had an average length of a glass component of about 0.41 µm, smaller than about 0.92 µm, on imaginary line α parallel or substantially parallel to a surface layer of an underlying electrode layer about 3 µm inside of the surface layer of the underlying electrode layer, but had a relatively large cross-sectional porosity of about 9%. The sample according to Comparative Example 2 thus passed the moisture resistance reliability test but failed the adhesion test.

The sample according to Comparative Example 3 included glass added such that a content of Zr obtained by converting $ZrO_2$ powder as a glass component was about 3 mol. The sample according to Comparative Example 3 accordingly had a relatively high cross-sectional porosity of about 8% and an average length of a glass component of about 1.1 µm, larger than about 0.92 µm, on imaginary line α parallel or substantially parallel to a surface layer of an underlying electrode layer about 3 µm inside of the surface layer of the underlying electrode layer. The sample according to Comparative Example 3 thus passed the adhesion test but failed the moisture resistance reliability test.

The sample according to Comparative Example 4 included glass added such that a content of Zr obtained by converting $ZrO_2$ powder as a glass component was about 5 mol. The sample according to Comparative Example 4 accordingly had a relatively high cross-sectional porosity of about 11% and an average length of a glass component of about 1.2 µm, larger than about 0.92 µm, on imaginary line α parallel or substantially parallel to a surface layer of an underlying electrode layer about 3 µm inside of the surface layer of the underlying electrode layer. The sample according to Comparative Example 4 thus passed the adhesion test but failed the moisture resistance reliability test.

The sample according to Comparative Example 5 included glass added such that a content of Zr obtained by converting $ZrO_2$ powder as a glass component was about 10 mol. The sample according to Comparative Example 5 accordingly had a relatively high cross-sectional porosity of about 13% and an average length of a glass component of about 1.4 µm, larger than about 0.92 µm, on imaginary line α parallel or substantially parallel to a surface layer of an underlying electrode layer about 3 µm inside of the surface layer of the underlying electrode layer. The sample according to Comparative Example 5 thus failed the adhesion test and failed the moisture resistance reliability test.

The above results confirm the following. In preferred embodiments of the present invention, the structures of the multilayer ceramic capacitors according to preferred embodiments of the present invention can be obtained by separately adding $ZrO_2$, which is a component of high erosion resistance, to glass powder without directly adding $ZrO_2$ to the conductive paste for the underlying electrode layer, and then dissolving the conductive paste for the underlying electrode layer in a solid solution state during sintering.

Consequently, $ZrO_2$ can be dissolved in glass in a solid solution state during sintering without impairing the effect as an original sintering aid of glass, thus reducing or preventing inhibition of sintering of a conductive paste for the underlying electrode layer while increasing an erosion resistance of glass in the external electrode, which enables densification. Thus, in a case of multilayer ceramic, for example, erosion of a glass component by a plating solution during plating of an external electrode can be reduced or prevented even when the thickness of the external electrode is reduced in a small-size, large-capacitance electronic component, and a decrease in mechanical strength can be reduced or prevented. It is thus confirmed that the moisture resistance reliability of a multilayer ceramic capacitor can be improved.

Although the preferred embodiments and the variations thereof of the present invention have been disclosed above, the present invention is not limited thereto.

For example, although the external electrode includes of an underlying electrode layer and two plating layers, the plating layer is not limited. Also, although the preferred embodiments described above disclose that, for example, moisture resistance reliability is improved by the configuration of an underlying electrode layer in a multilayer ceramic capacitor, simultaneous use of a different configuration to improve moisture resistance reliability may be implemented.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
   a multilayer body including a stack of a plurality of ceramic layers and including a first main surface and a second main surface facing each other in a stacking direction, a first lateral surface and a second lateral surface facing each other in a width direction orthogonal or substantially orthogonal to the stacking direction, and a first end surface and a second end surface facing each other in a length direction orthogonal or substantially orthogonal to the stacking direction and the width direction;
   a first internal electrode layer on a corresponding one of the plurality of ceramic layers and located inside the multilayer body;
   a second internal electrode layer on a corresponding one of the plurality of ceramic layers and located inside the multilayer body;
   a first external electrode including a first underlying electrode layer on the first end surface; and
   a second external electrode including a second underlying electrode layer on the second end surface; wherein
   the first underlying electrode layer and the second underlying electrode layer each include a metal component and a glass component;
   the glass component includes Zr and Ba;
   a Zr/Ba atomic number ratio is not less than about 0.03 and not greater than about 0.15; and
   the first underlying electrode layer and the second underlying electrode layer each have a glass-occupied area ratio of not less than about 18% in a cross-section orthogonal or substantially orthogonal to a direction of a surface of a surface layer of each of the first underlying electrode layer and the second underlying electrode layer, and in a SEM image in the cross-section, an average length of the glass component on an imaginary line is not greater than about 0.92 µm, the imaginary line being parallel or substantially parallel to the surface of the surface layer of each of the first underlying electrode layer and the second underlying electrode layer about 3 μm inside of the surface layer of each of the first underlying electrode layer and the second underlying electrode layer.

2. The multilayer ceramic electronic component according to claim 1, wherein the first underlying electrode layer and the second underlying electrode layer each have a cross-sectional porosity of not greater than about 6% in the cross-section.

3. A method of manufacturing a multilayer ceramic electronic component, the multilayer ceramic electronic component including a multilayer body including a stack of a plurality of ceramic layers and including a first main surface and a second main surface facing each other in a stacking direction, a first lateral surface and a second lateral surface facing each other in a width direction orthogonal or substantially orthogonal to the stacking direction, and a first end surface and a second end surface facing each other in a length direction orthogonal or substantially orthogonal to the stacking direction and the width direction, a first internal electrode layer on a corresponding one of the plurality of ceramic layers and located inside the multilayer body, a second internal electrode layer on a corresponding one of the plurality of ceramic layers and located inside the multilayer body, a first external electrode including a first underlying electrode layer on the first end surface, and a second external electrode including a second underlying electrode layer on the second end surface, the method comprising:
    preparing the multilayer body;
    preparing a conductive paste for the first underlying electrode layer, the conductive paste including a metal component and a glass component;
    preparing a conductive paste for the second underlying electrode layer, the conductive paste including the metal component and the glass component;
    applying the conductive paste for the first underlying electrode layer onto the first end surface of the multilayer body;
    applying the conductive paste for the second underlying electrode layer onto the second end surface of the multilayer body;
    baking the conductive paste for the first underlying electrode layer applied on the first end surface; and
    baking the conductive paste for the second underlying electrode layer applied on the second end surface; wherein
    in the preparing the conductive paste for the first underlying electrode layer including the metal component and the glass component, $ZrO_2$ powder is added separately from metal powder and glass powder included in the conductive paste for the first underlying electrode layer;
    in the preparing the conductive paste for the second underlying electrode layer including the metal component and the glass component, $ZrO_2$ powder is added separately from the metal powder and the glass powder included in the conductive paste for the second underlying electrode layer;
    the metal component included in each of the conductive paste for the first underlying electrode layer and the conductive paste for the second underlying electrode layer has a central grain size of not less than about 0.2 μm and not greater than about 2.0 μm; and
    the glass component included in each of the conductive paste for the first underlying electrode layer and the conductive paste for the second underlying electrode layer includes Ba, a glass volume fraction is not less than about 20 vol %, and a Zr content obtained by converting $ZrO_2$ powder as the glass component is not less than about 3 mol % and not greater than about 5 mol %.

4. The method according to claim 3, wherein the metal powder is coated with $ZrO_2$ powder in the addition of the $ZrO_2$ powder added separately.

5. The multilayer ceramic electronic component according to claim 1, wherein
    the first internal electrode layer includes a first facing portion facing the second internal electrode layer and a first extending portion extending from the first facing portion to the first end surface; and
    the second internal electrode layer includes a second facing portion facing the first internal electrode layer and a second extending portion extending from the second facing portion to the second end surface.

6. The multilayer ceramic electronic component according to claim 5, wherein each of the first and second facing portions has a rectangular or substantially rectangular shape.

7. The multilayer ceramic electronic component according to claim 5, wherein each of the first and second extending portions has a rectangular or substantially rectangular shape.

8. The multilayer ceramic electronic component according to claim 1, wherein each of the first and second internal electrode layers includes at least one of Ni, Cu, Ag, Pd, Au, or an alloy including at least one of Ni, Cu, Ag, Pd, or Au.

9. The multilayer ceramic electronic component according to claim 1, wherein each of the first and second internal electrode layers has a thickness of not less than about 0.2 μm and not greater than about 2.0 μm.

10. The multilayer ceramic electronic component according to claim 1, wherein the metal component in each of the first and second external electrodes includes at least one of Cu, Ni, Ag, Pd, Ag—Pd alloy, or Au.

11. The multilayer ceramic electronic component according to claim 1, wherein each of the first and second underlying electrode layers has a thickness of not less than about 15 μm and not greater than about 160 μm.

12. The multilayer ceramic electronic component according to claim 1, wherein each of the first and second underlying electrode layers extends to a portion of the first main surface, a portion of the second main surface, a portion of the first lateral surface and a portion of the second lateral surface.

13. The multilayer ceramic electronic component according to claim 12, wherein a maximum thickness of each of the first and second underlying electrode layers on the portion of the first main surface, the portion of the second main surface, the portion of the first lateral surface and the portion of the second lateral surface is not less than about 5 μm and not greater than about 40 μm.

14. The multilayer ceramic electronic component according to claim 1, wherein
    the first external electrode includes a first plating layer covering the first underlying electrode layer; and
    the second external electrode includes a second plating layer covering the second underlying electrode layer.

15. The multilayer ceramic electronic component according to claim 14, wherein
    the first plating layer includes a first lower plating layer covering the first underlying electrode layer and a first upper plating layer covering the first lower plating layer; and the second plating layer includes a second lower plating layer covering the second underlying electrode layer and a second upper plating layer covering the second lower plating.

16. The multilayer ceramic electronic component according to claim 14, wherein each of the first and second plating layers includes at least one of Cu, Ni, Ag, Pd, Ag—Pd alloy, or Au.

17. The multilayer ceramic electronic component according to claim 15, wherein
each of the first and second lower plating layers is a Ni plating layer; and
each of the first and second upper plating layers is a Sn plating layer.

18. The multilayer ceramic electronic component according to claim 14, wherein each of the first and second plating layers has a thickness of not less than about 2 µm and not greater than about 15 µm.

* * * * *